(12) United States Patent
Mantell et al.

(10) Patent No.: US 6,751,358 B1
(45) Date of Patent: Jun. 15, 2004

(54) ERROR DIFFUSION FOR DIGITAL PRINTING

(75) Inventors: David A. Mantell, Rochester, NY (US); James B. Kuwik, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/337,435

(22) Filed: Jun. 21, 1999

(51) Int. Cl.[7] .................. G06K 9/36; G06K 9/38; G06K 9/46
(52) U.S. Cl. .............. 382/252; 358/1.9; 358/3.21; 358/3.22; 358/465; 358/466
(58) Field of Search .................. 358/3.03, 3.26, 358/534, 3.05, 1.15, 536, 1.9, 3.21, 3.22, 465, 466; 382/252, 275

(56) References Cited

U.S. PATENT DOCUMENTS

| | | | |
|---|---|---|---|
| 5,258,854 A | * 11/1993 | Eschbach | 358/445 |
| 5,535,019 A | 7/1996 | Eschbach | 358/456 |
| 5,621,546 A | * 4/1997 | Klassen et al. | 358/536 |
| 5,748,785 A | 5/1998 | Mantell et al. | 382/237 |
| 5,991,512 A | * 11/1999 | Shaked et al. | 358/1.9 |
| 6,185,006 B1 | * 2/2001 | Yoshida | 358/1.9 |
| 2002/0041397 A1 | * 4/2002 | Rombola et al. | 358/3.05 |
| 2002/0186411 A1 | * 12/2002 | Wang et al. | 358/1.15 |
| 2003/0133160 A1 | * 7/2003 | Sharma et al. | 358/3.06 |
| 2004/0010633 A1 | * 1/2004 | Ishikawa | 710/1 |

* cited by examiner

Primary Examiner—Kimberly Williams
Assistant Examiner—Melanie M. Vida
(74) Attorney, Agent, or Firm—R. Hutter

(57) ABSTRACT

A system for simulating grayscales in a digital printer, such as an ink-jet printer, exploits a modified error diffusion technique. When a datum for a particular pixel in an image is 0, the datum is substituted with a low-level artificial datum such as 4 on a scale from 0 to 255. The addition of the artificial datum in the error diffusion algorithm avoids artifacts caused by the presence of large number of zeros in the error diffusion algorithm.

11 Claims, 2 Drawing Sheets

ERROR DIFFUSION FOR DIGITAL PRINTING

FIELD OF THE INVENTION

The present invention relates to an improvement in error-diffusion-based halftone techniques usable in a digital printer, such as a xerographic or ink-jet digital printer.

BACKGROUND OF THE INVENTION

Common systems for printing an image based on original digital image data, such as xerographic printing and the various forms of ink-jet printing, are typically "binary" or "all or nothing" printing processes. In other words, for a pixel-sized small area in an image to be printed, the nature of the printing hardware is such that the hardware can place a mark in the area, rendering the small area completely black, or not print in the area, rendering the small area white. However, image data is readily available as grayscale data: that is, for any pixel-sized area in an image to be printed, the image data can express a grayscale level for the individual pixel area typically on a scale of 0 (completely white) to 255 (completely black), with each of the intermediate levels representative of a different gradation of gray. (Of course, although a monochrome binary system will be described throughout this specification, the general principles will of course apply to color and multi-level printing as well.) A common design challenge is attempting to render a grayscale area over a multipixel area using such a binary digital printing apparatus. Over a large number of pixel areas, one can distribute black pixels so that, viewed from a distance, the area simulates a grayscale of a desired darkness.

One well-known technique for simulating a gray area with a distribution of black pixels is known as error diffusion. In one straightforward embodiment of error diffusion, for each pixel, the apparatus will decide to print the pixel black if the grayscale is above a certain threshold, such as 128 on the 0 to 255 scale, and leave the area white if the grayscale is below the threshold. However, when each decision is made, the error resulting from the decision, that is the difference between the actual grayscale of the pixel datum and the threshold or some other number, is "diffused" to a set of pixels which neighbor the pixel in question. By diffusing the error, a certain amount of grayscale is either added or subtracted to the grayscale of the neighboring pixel, and will thus influence whether that neighboring pixel will be printed black or white. Over a large number of pixels, the desired overall effect is that a gray area will be created of a desired darkness.

One advantage of error diffusion is that the calculations can be made in real time, essentially while the image is being printed: for a running set of pixels, the accumulated errors associated with each of a series of pixels, which determine whether the particular pixel area should be printed black or white, are assigned to buffers in a memory, and these buffers accumulate errors from various neighboring pixels up until the time a particular pixel is about to be printed.

Although error diffusion techniques are largely successful at simulating grayscales with digital printing devices, any number of subtle practical problems have been observed with the basic technique. One noticeable problem with basic error diffusion techniques is "worms". In general, these print defects result from the fact that, when a grayscale area is simulated with error diffusion, those black spots which are generated by the error diffusion algorithm have a tendency not to be evenly distributed through the intended grayscale area, but rather aggregate in curved lines within the area, thus forming conspicuous print defects. Various techniques have been attempted in the past for overcoming these defects, while still maintaining the simplicity of the error diffusion technique.

The present invention relates to an improvement in the basic error diffusion printing system which could be used with any digital printer, such as a xerographic printer or any type of ink-jet printer.

DESCRIPTION OF THE PRIOR ART

U.S. Pat. No. 5,535,019 is representative of currently-known techniques to improve error diffusion half toning. Columns 1–2 of the patent give an overall treatise on the prior art of error diffusion printing, with references to further art.

U.S. Pat. 5,748,785 discloses an advanced system of error diffusion, which can be used in conjunction with the present invention. This advanced type of error diffusion system is particularly useful in printing full-color images.

SUMMARY OF THE INVENTION

According to one aspect of the present invention, there is provided a method of processing digital image data, for printing with a digital printing apparatus. A digital image datum corresponding to a pixel is submitted to a function whereby, for a given pixel in the image data, the digital printing apparatus is instructed to print a mark if the image datum for the given pixel is above a first predetermined threshold, and an error derived from a relationship between the datum and the threshold is distributed among neighboring image data of a predetermined spatial relationship to the given pixel. For a digital image datum having a grayscale value below a second predetermined threshold, an artificial image datum is substituted for the image datum.

According to another aspect of the present invention, there is provided a method of processing digital image data, for printing with a digital printing apparatus, the digital printing apparatus being capable of outputting a mark in a pixel area of a predetermined grayscale value. A digital image datum corresponding to a pixel to a is submitted to a function whereby, for a given pixel in the image data, the digital printing apparatus is instructed to print a mark of the predetermined grayscale value if the image datum for the given pixel is within a first predetermined grayscale range, and an error derived from a relationship between the datum and the grayscale range is distributed among neighboring image data of a predetermined spatial relationship to the given pixel. For a digital image datum having a grayscale value within a second predetermined grayscale range, an artificial image datum is substituted for the image datum.

DETAILED DESCRIPTION OF THE INVENTION

Figure 1:
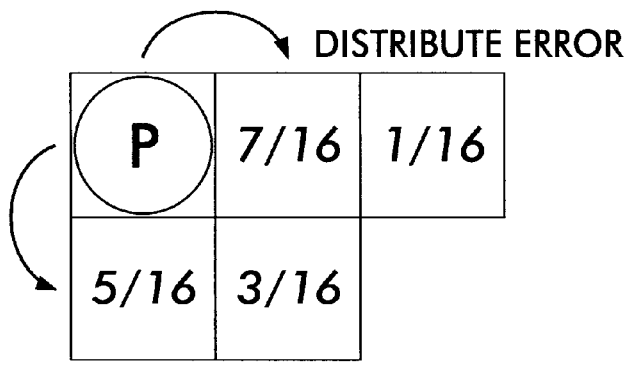
FIG. 1 is a simplified view of one pixel and neighboring pixels, as would appear in image data, illustrating the basic principle of error diffusion.

FIG. 1 shows the general principle of error diffusion such as shown, for example in the well-known "Floyd-Steinberg"

error diffusion system. Assume that pixel P is a pixel area corresponding to one small area in a larger area which is intended to be printed at an overall grayscale level. Once again, while grayscale levels in original image data can be described in the image data on a scale of gradations from 0 to 255, most digital printing apparatus, such as xerographic and ink-jet, can only make an "all-or-nothing" decision for each individual pixel, and the point of error diffusion is to accumulate a relatively large number of these all-or-nothing decisions so that, for a given relatively large area in an image, the overall optical effect is of a gray area.

Taking a straightforward case, wherein the original image data is a grayscale level between 0 and 255 over a relatively large number of pixels and the threshold for determining whether to print a small pixel area black or white is 128 on this grayscale (broadly speaking , the "first predetermined threshold"), assume for simplicity that the larger area is desired to be printed on a grayscale level of 144. Because 144 is above the threshold of 128, the pixel P will be determined to be a print-black pixel. However, the error between the threshold and the actual desired grayscale 144−128=16, is "diffused" to neighboring pixels, and influences whether those neighboring pixels will be print-black or print-white. In the illustration shown, the extra 16 values of grayscale are distributed (by dividing the error, as shown) among a certain subset of neighboring pixels, all of which are intended to be printed after the decision has been made for pixel P (this is assuming that decisions about whether to print a pixel black or white are made from left to right, top to down). By distributing these errors to neighboring pixels, the decision on whether these neighboring pixels will be print-black or print-white will be influenced; and indeed, except for a very first pixel in an image, the pixel P itself will include diffused error from any number of previous print decisions for previously-printed pixels.

Figure 2:
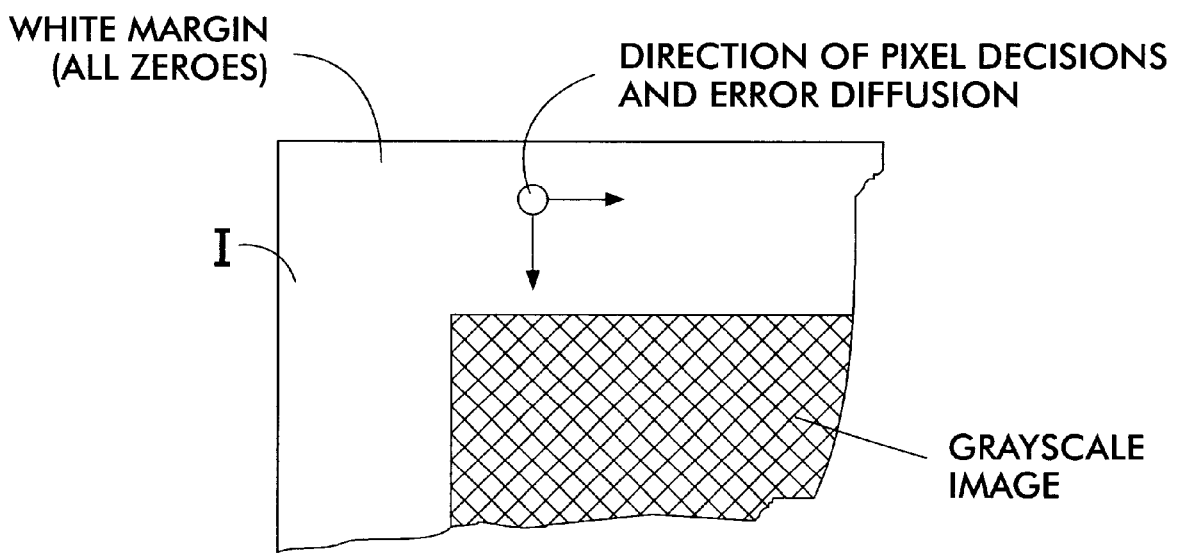
FIG. 2 is a simplified view of a portion of an image to be printed, illustrating a problem addressed by the method of the present invention.

Given the basic principle of error diffusion to simulate grayscale in a digital printer, certain practical problems will be apparent, such as shown in FIG. 2. As shown, in applying an error-diffusion technique, the pixel from which the succession of error diffusions are made in effect "moves" across and down the image 1, distributing the error therefrom to adjacent pixels and in turn receiving errors from previous pixels. If it is desired within an image to print a relatively large area of pure white (a long series of pixels of a grayscale value of 0), such as would occur in a top margin of a page of text, or even a white space between two grayscale images on a single page, the large numbers of zeros in a long series of the error diffusion algorithms will bias the error diffusion characteristics once black pixels are returned to the image such as when the error-diffusion pixel suddenly "hits" a grayscale image. In other words, while a particular error diffusion algorithm may be successful within a single grayscale image, the effect of surrounding white or light spaces, which are quite common in any printed image, will influence the error diffusion algorithms when the grayscale image itself is printed. Among the resulting defects are noticeably incorrect or distorted grayscale areas toward the top of an image, and "worms" in very light and dark portions of a grayscale image.

The present invention addresses these problems caused by this "white area bias" by substituting, whenever a pure white or zero pixel datum appears in the original image data to be printed, a relatively small "artificial datum," which should be of just enough value to maintain some non-zero values in the accumulating buffers of diffused errors for a particular pixel. In one practical embodiment, this artificial datum is 4 on a scale of 0 to 255. Ideally, while a large white space is being printed as part of an image or page, there should be some small amount of error data being circulated among the various error algorithms, but preferably these errors should always remain low enough so that few or no pixels in an intended white area are actually printed black. However, once darker areas are once again printed, and the values in the error buffers once again are dealing with data representative of a precise grayscale desired to be printed, the previously-determined large areas of white space will not bias the error diffusion algorithms and the grayscale areas will not be distorted in the final print.

Figure 3:
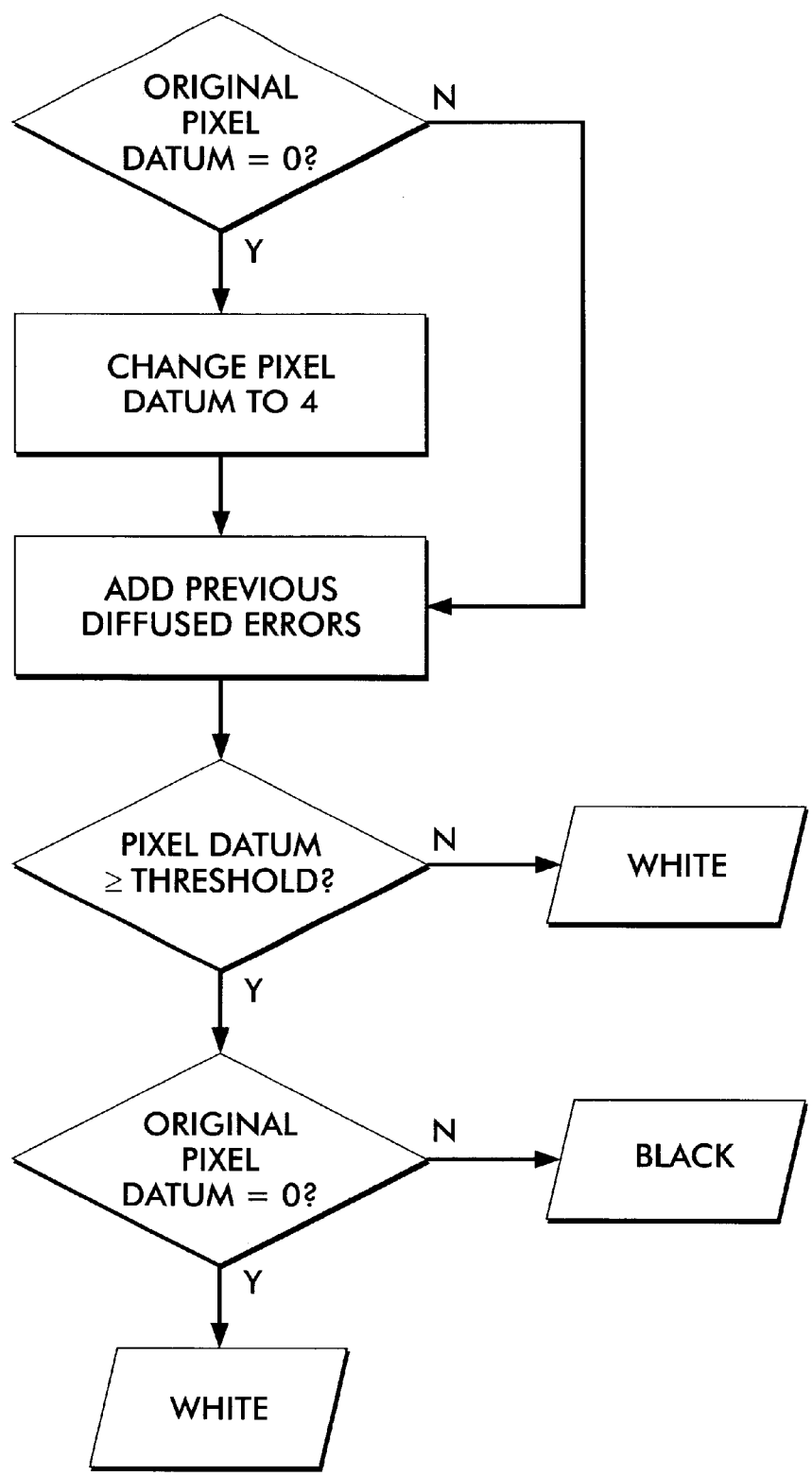
FIG. 3 is a flow chart illustrating the method of the present invention.

FIG. 3 is a flow chart illustrating the principle of a preferred embodiment of the present invention. The advantage of the method described in FIG. 3 is that it is relatively simple and can be applied uniformly to every pixel in an image, whether that image includes text or a grayscale image: it does not have to be selectably "turned off" in certain situations. As can be seen In the flow chart, if an original pixel datum (that is from the original Image data, and not yet influenced by the added error from previous error diffusion decisions) is 0 or print-white (or more broadly, below a second predetermined threshold: or within a second predetermined gray scale range), the pixel datum of 0 is substituted with a relatively small artificial pixel datum such as in this example 4 on a 0–255 scale. If the first predetermined threshold for a print-black pixel is 128 on this scale, it is clear that a value of 4 is unlikely, except after many iterations of error diffusion algorithms, to place a pixel datum anywhere near the threshold, Thus, a large number of white pixel areas of an original datum of 0 will largely continue to be printed white in a manner inconspicuous in:the resulting print.

However, of course, the cumulative affect of a large number of pixels of a value of 4 on the scale will eventually accumulate in the error buffers so that, now and then, within a white area, the accumulated error will cause the pixel datum, after addition of previous diffused errors, to be over the first predetermined threshold. In such a case, while printing a relatively large white area, there could be a "stray" black spot caused by the accumulation of these low artificial 4's pushing the accumulated error over the threshold. In such a case; where the pixel datum is equal or above the first predetermined threshold, the method goes back and checks if the original pixel datum is 0. If so, printing of the error diffusion-caused black pixel is suppressed, as shown.

However, once the error diffusion algorithm begins to work with grayscale data of a desired grayscale value, the error buffers will already have in them a residual level of error, and this residual level of error in the buffers will have the influence on the printing of the actual grayscale data of avoiding artifacts caused by the previous printing of a large area of white space.

Although the illustrated method has the advantage of simplicity of implementation, in that the algorithm of FIG. 3 is "always on" when processing image data, it may in some circumstances be desirable to apply the algorithm only when it is determined that a contiguous white space of a certain minimum size is being processed in the image desired to be printed.

While the method has been described with a fixed number for the artificial datum, a varying number can be used. This number can be chosen from among a fixed set of numbers generated randomly, or selected in an ordered pattern from a predetermined list of values.

This technique is most useful for light regions, but it can equally well apply to dark regions as well where the input value is 255. An artificial datum of 251 could be used while the output will be 255 regardless of the results of the error calculation. With reference to the claims below, this principle can be generalized by saying that a non-print-white pixel datum (such as 4) is substituted when the datum is within a predetermined grayscale range which includes print white (0), and a non-print-black pixel datum (such as 251) is substituted when the datum is within a predetermined grayscale range which includes print black (255). Likewise, the method can be used for intermediate values in a multi-level error diffusion: when an input value is equal to one of the possible output grayscale values of the printing apparatus, a small additional term can be added to or subtracted from the input value. If an output value other than the input value is calculated, the original input value is substituted.

Although this specification is directed to a digital printer, it applies equally well to other output devices, such as displays or any electronically stored image. While the description of this invention applies to error diffusion, it can be applied to any feedback controlled image processing algorithm. Although only the monochrome embodiment of the present invention is here illustrated, the system of the present invention can readily be incorporated with regard to different color separations in a full-color system.

The present invention has been found particularly useful when used in conjunction with separate functions for removing "worms" from grayscale data. In particular, the function described in U.S. Pat. No. 5,748,785, particularly applicable to color images, has been found to yield particularly good results in conjunction with the present invention.

What is claimed is:

1. A method of processing original digital image data, for printing with a digital printing apparatus, comprising the steps of:

submitting a digital image datum corresponding to a pixel to a function whereby, for a given pixel in the image data, the digital printing apparatus is instructed to print a mark if the digital image datum for the given pixel is above a first predetermined threshold, and an error derived from a relationship between the digital image datum and the first predetermined threshold is distributed among neighboring image data of a predetermined spatial relationship to the given pixel; and for a digital image datum in the original image data having a grayscale value below a second predetermined threshold, substituting for the digital image datum an artificial image datum before submitting the digital image datum to the function.

2. The method of claim 1, in which the function comprises an error diffusion algorithm.

3. The method of claim 1, wherein the digital image datum causing the substituting step has a value of zero.

4. The method of claim 1, wherein the digital image datum causing the substituting step occurs in a contiguous area of white space of predetermined size in the digital image data.

5. The method of claim 1, further comprising the step of for a digital image datum having a grayscale value below the first predetermined threshold, suppressing printing of any mark resulting from the function.

6. The method of claim 1, wherein the artificial datum is a constant value.

7. The method of claim 1, wherein the artificial datum derives from a random-number generation.

8. The method of claim 1, wherein the artificial datum is chosen from a set of predetermined values.

9. A method of processing original digital image data, for printing with a digital printing apparatus, the digital printing apparatus being capable of outputting a mark in a pixel area of a predetermined grayscale value, comprising the steps of:

submitting a digital image datum corresponding to a pixel to a function whereby, for a given pixel in the image data, the digital printing apparatus is instructed to print a mark of the predetermined grayscale value if the digital image datum for the given pixel is within a first predetermined grayscale range, and an error derived from a relationship between the digital image datum and the first predetermined grayscale range is distributed among neighboring image data of a predetermined spatial relationship to the given pixel; and for a digital image datum in the original image data having a grayscale value within a second predetermined grayscale range, substituting for the digital image datum an artificial image datum, before submitting the digital image datum to the function.

10. The method of claim 9, wherein the second predetermined grayscale range includes print-white.

11. The method of claim 10, wherein the artificial image datum is not print-white.

* * * * *